March 24, 1953 G. MEZZERA 2,632,229
ROLLER FELTING MACHINE
Filed Aug. 26, 1949 8 Sheets-Sheet 2

INVENTOR:
GUIDO MEZZERA
BY K. A. Mayr
ATTORNEY:

March 24, 1953 G. MEZZERA 2,632,229
ROLLER FELTING MACHINE
Filed Aug. 26, 1949 8 Sheets-Sheet 6

INVENTOR:
GUIDO MEZZERA.
BY K. A. Mayr.
ATTORNEY:

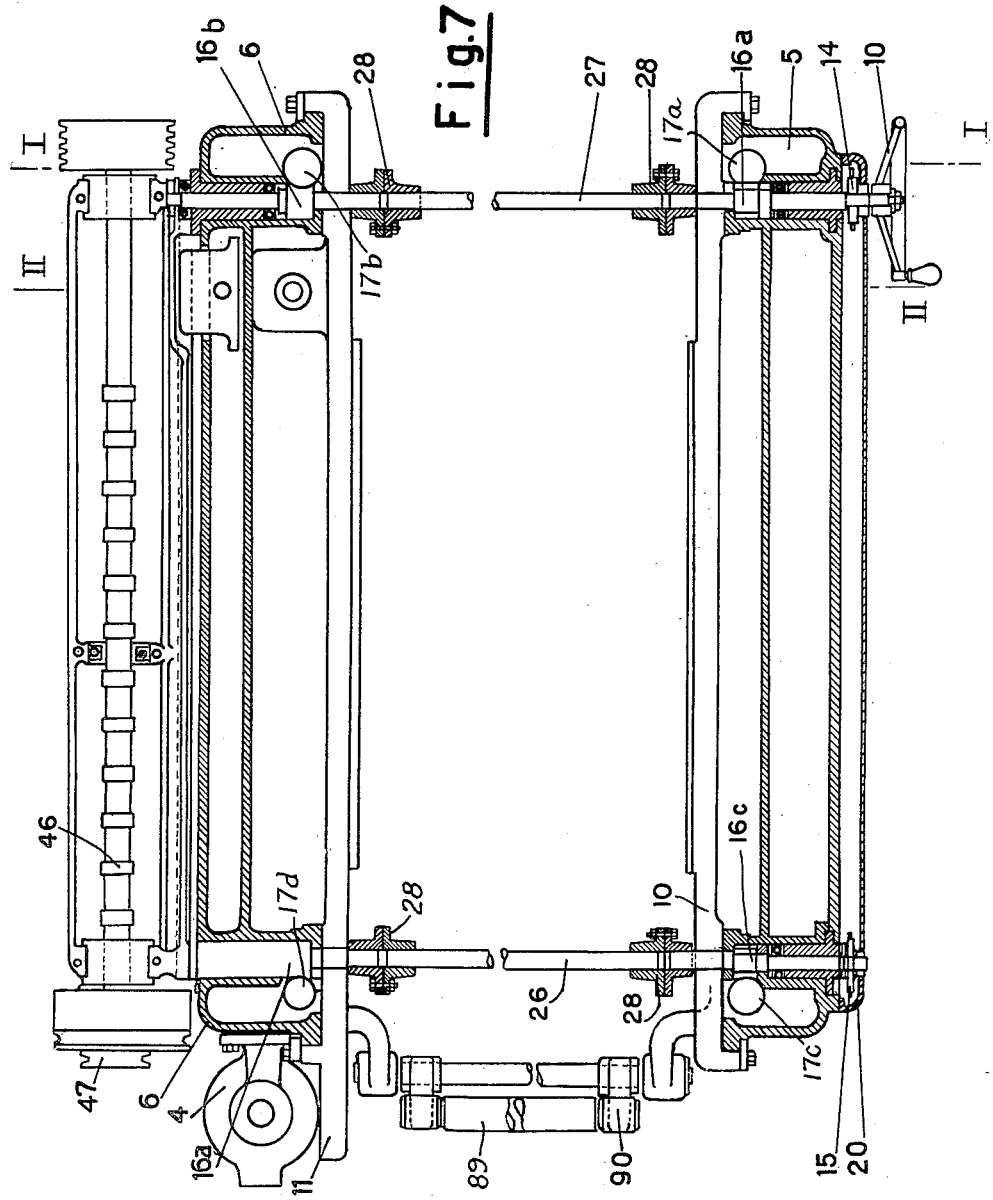

March 24, 1953 — G. MEZZERA — 2,632,229
ROLLER FELTING MACHINE
Filed Aug. 26, 1949 — 8 Sheets-Sheet 8
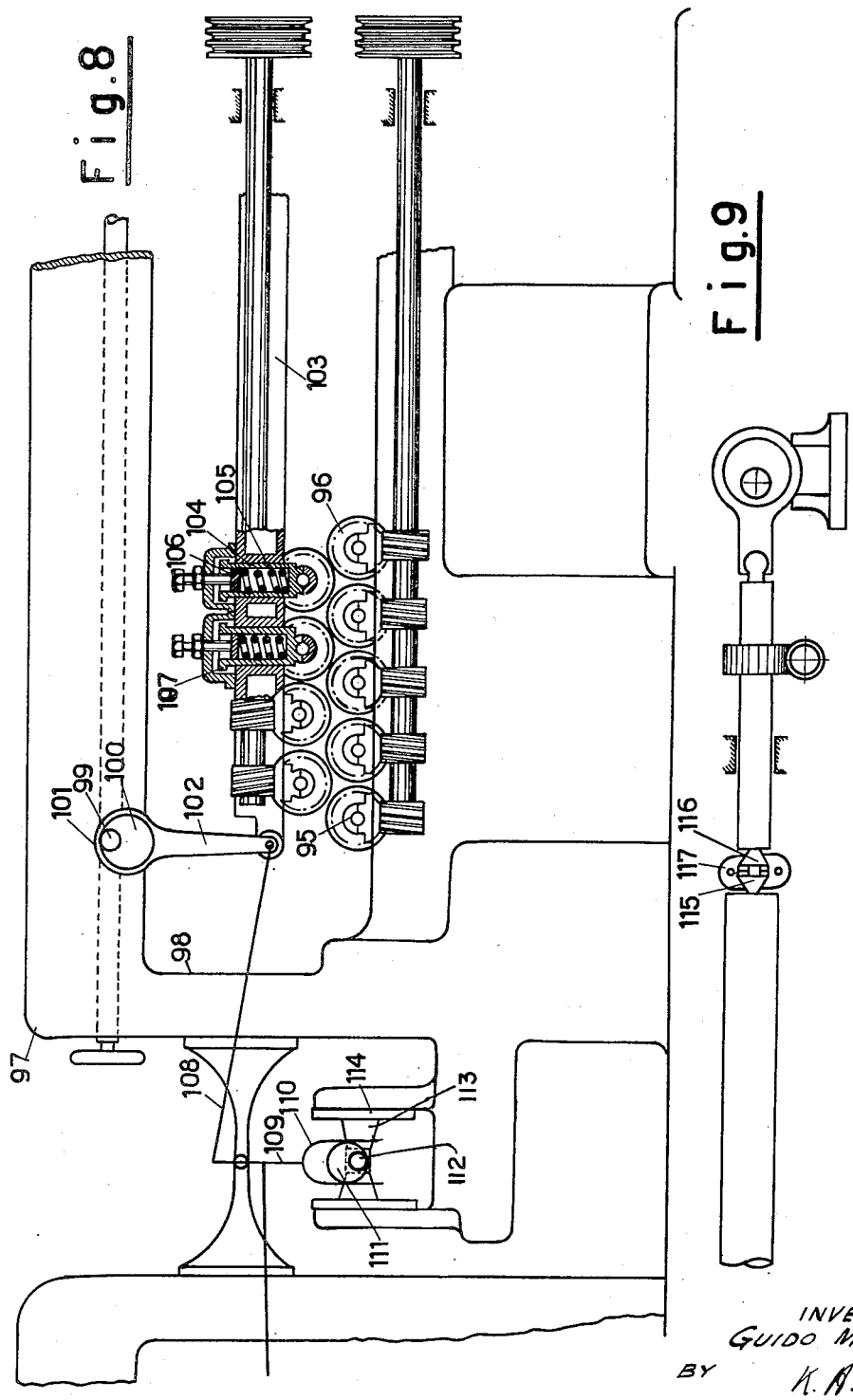
INVENTOR:
GUIDO MEZZERA.
BY K. A. Mayr
ATTORNEY:

Patented Mar. 24, 1953

2,632,229

UNITED STATES PATENT OFFICE 2,632,229

ROLLER FELTING MACHINE

Guido Mezzera, Milan, Italy

Application August 26, 1949, Serial No. 112,464
In Italy August 27, 1948

2 Claims. (Cl. 28—5)

This invention relates to a machine for the fulling of felt. One object of the invention is to provide a machine which requires less time for the fulling of felts than conventional machines.

Further objects of the invention reside in the provision of a roller felting machine which produces a more regular compactness of the felts, which reduces installation costs, which turns out a better product, and whose output is nearly twice as great as that of conventional machines.

One feature of the invention is the provision of a machine having three rows of fulling rollers, of which the upper and lower rollers have a movement normal to the axial oscillatory movement of the intermediate rollers.

The machine according to the invention comprises a stationary frame, a set of rollers rotatably supported by said frame, a second frame, a set of rollers rotatably supported by said second frame, support levers fulcrumed on said stationary frame and having an arm carrying said second frame, and equilibrium means connected with said support levers for counterbalancing the weight of said second frame and of the rollers supported thereby.

The machine further comprises:

(a) A supporting frame and control means for controlling the various moving members and of means for changing the speed of roller rotation;

(b) Two supporting columns connected with each other by crossbeams and carrying a slide, which supports upper and lower oscillating frames comprising bearings for the fulling rollers and which supports all the other mechanism forming part of the machine. The machine includes a system adapted to produce a double fulling of the felt and comprises means advancing:

The felt between rows of fulling rollers, of which a row of intermediate rollers has a very rapid axial oscillatory movement and a lower and an upper row have a less rapid oscillatory movement in a vertical plane normal to the axial oscillatory movement of the intermediate rollers.

The felt passes between lower and intermediate rollers and, after leaving the rollers, is conveyed by a band to pass between the intermediate and upper rollers or, first between the upper and intermediate rollers and thereupon between the intermediate and lower rollers, feeding and collecting of the felts taking place at the same side of the machine which is a great advantage.

Feeding is effected by laying the felts on a horizontal plane and collecting is effected on a slightly inclined plane, which collects all the felts emerging between the row of upper and intermediate rollers or, feeding is effected by causing the felts to enter between the upper and intermediate rollers and the felts are collected when they emerge from between the intermediate and lower rollers, on the horizontal plane. Besides the rotary movement which is common to all rollers, there is imparted to the intermediate rollers a very rapid axial oscillation obtained by means of a shaft having eccentrics, oscillation of each roller being out of phase of that of the adjacent roller. The upper and lower rollers are individually supported by frames to which an oscillating movement is imparted which is normal to the axial oscillatory movement of the intermediate rollers, the lower and upper rollers being oscillated in the same manner as the frames.

The impact of the upper and lower rollers against the intermediate rollers (while felts are interposed), is adjusted in such a way as to obtain a greater or smaller force of impact on the felts in accordance with the distance of the upper and lower rollers from the intermediate rollers.

The closer the upper and lower rollers are to the intermediate rollers, the heavier is the impact on the felts; the wider the rollers are apart, the smaller will be the force of impact and, therefore, the fulling effect. To obtain and facilitate the passage of the felts between the rollers, it is preferred to provide suitable longitudinal fluting on the rollers. Because the rotary movement of the intermediate rollers is opposite to that of the upper and lower rollers, the felts are forwarded from the inlet to the outlet, while being beaten continually.

According to a preferred embodiment of the invention, the rollers can be driven at three different speeds, by means of a speed changing gear. Therefore, three or more fulling speeds are available for selectively producing three different numbers of impacts on each centimetre length of the felt. The mechanism that controls the passage of the felts from between the intermediate and lower rollers to the intermediate and upper row, is constituted by an endless rubber band which unrolls tangentially of and along precise directions from the three end rollers. The mechanism also permits increasing the distance between the upper and lower rollers, respectively, and between the intermediate rollers on the other roller without causing any inconvenience, the whole system being mounted in such a manner as to afford such displacements. A constructional feature of primary importance is the mounting of the frames carrying the lower and upper rollers. Whereas the intermediate rollers are arranged on a fixed horizontal plane, the frames carrying the lower and upper rollers can be shifted vertically, the lower ones downward and the upper ones upward. The possibility of vertically shifting the frames and, therefore, the rollers, facilitates cleaning and inspecting of the machine.

In order to impart to both the lower and upper frames and, therefore, to the respective rollers, a constant and resilient pressure against the intermediate rollers, each individual frame is supported in the following manner:

(1) The upper frame rests with its whole weight on the upper part of the intermediate rollers; this weight, however, can be completely balanced or increased by a system of levers and counterweights, making it possible to exactly adjust the pressure exerted between the rollers, while maintaining the required resilience.

(2) The lower frame with its rollers tends to move away from the rollers because of its weight. It is resiliently supported independently of the upper frame, by a system of levers and counterweights, so that besides counterbalancing the weight of the whole assembly, it is possible to exert an adjustable and elastic pressure equal to that exerted by the upper rollers, producing a regular and constant pressure between the intermediate and lower rollers, which is an advantage which cannot be attained by any other system of adjustment.

In addition to this system of levers and counterweights, which imparts a general elasticity to all the assemblies of roller carrying frames, both lower and upper, a resilient bearing is provided for each individual roller carrying support, i. e. lower and upper, in such a manner that each individual roller can undergo any movement resulting from either the oscillating impact or from difference of thickness of the felt interposed between the rollers. For wetting the felts during the fulling operation, a bin of stainless steel sheet with suitable perforations is provided above the rollers.

Below the rollers there is provided another bin with a pipe placed inside, which bin acts as a collecting bin for the acidulated water dropping from the upper bin, and, by means of the pipe, wets the felts also while they pass between the row of intermediate and lower rollers collecting the liquid dropping from both, and conveying it through a flexible hose into a decantation bin, where a pump provides for returning the acidulated water into the upper bin.

In order that the invention be more fully understood, two preferred embodiments are represented in the accompanying drawing.

Fig. 7 is a horizontal sectional view of the machine, the section being made along line VII—VII of Fig. 1;

Fig. 8 is a side view of a portion of a modified machine according to the invention, with parts broken off;

Fig. 9 illustrates a mechanical detail of a machine according to the invention.

Like parts are designated by like numerals in all Figures of the drawing.

Figure 3:
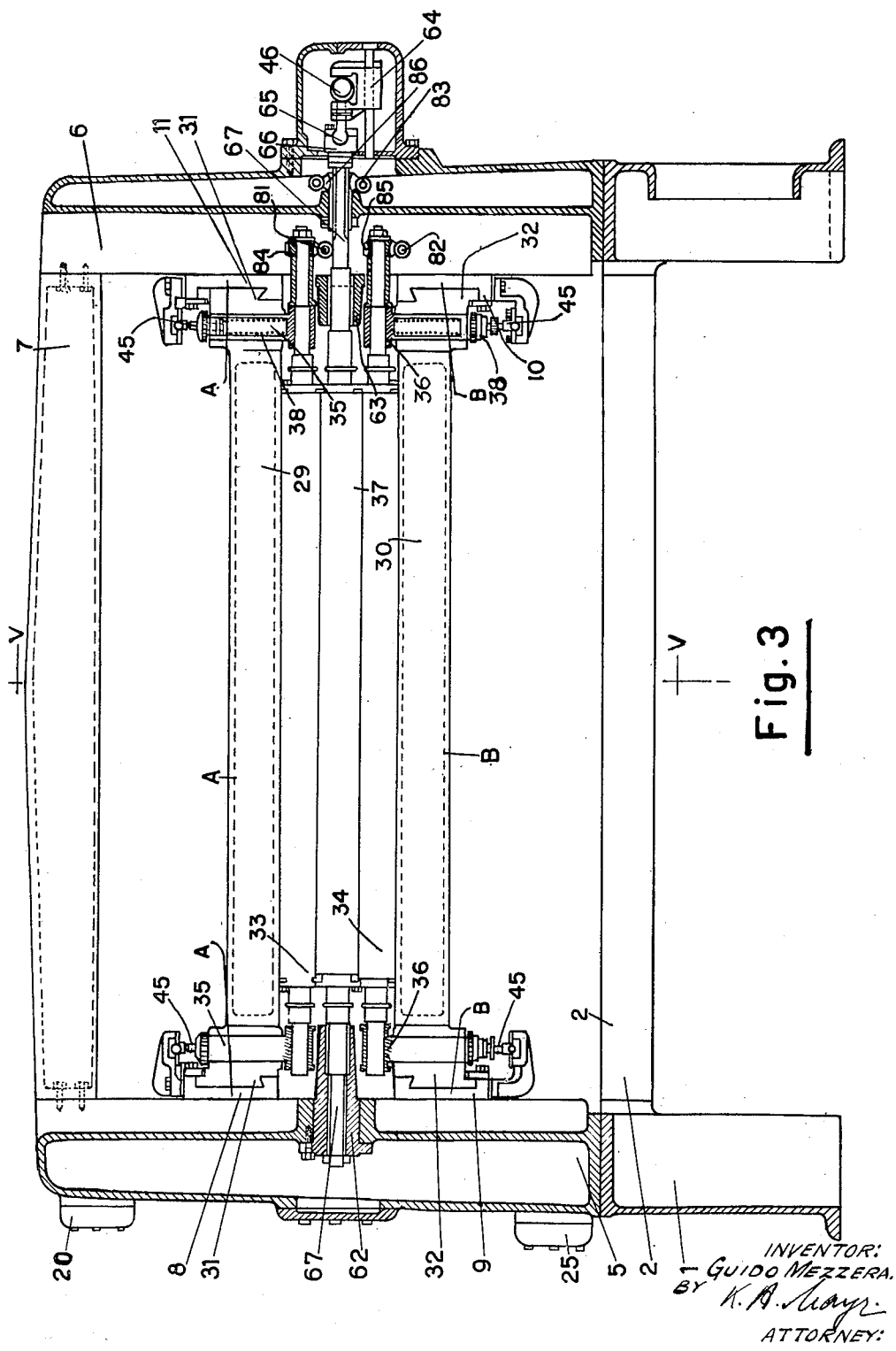
Fig. 3 shows a cross-section made along line III—III in Fig. 5.
Figure 4:
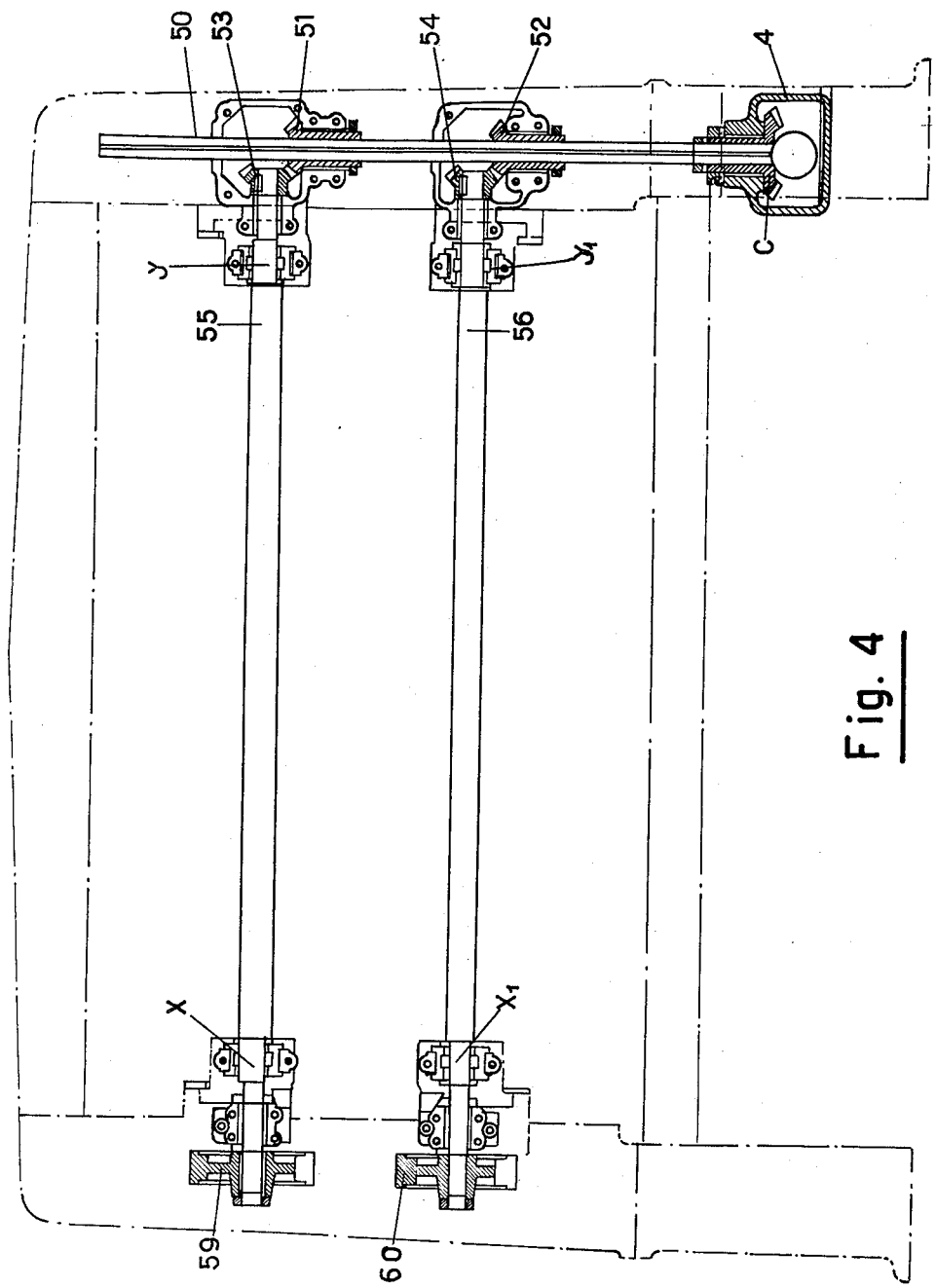
Fig. 4 is a part sectional view of parts of the machine according to the invention, the section being made along line IV—IV in Fig. 5.

Referring more particularly to Figs. 1 to 7 of the drawing, numeral 1 designates a supporting frame having cross-beams 2 and provisions connecting a gear box 3 and a control box 4 for displacing the roller carrying frames A and B, Fig. 3. The supporting columns 5 and 6 are rigidly connected with one another by cross-beams 7. On the supporting shoulders are vertically slidable the frame carrying slides 8, 9, 10 and 11. The vertical displacement of the slides carrying the frames is effected by hand by means of two hand wheels 12 and 13. The hand wheel 12 displaces the upper frame A through the chain gearing 14 and 15, Fig. 7, the worms $16a$, $16b$, $16c$ and $16d$, the worm wheels $17a$, $17b$, $17c$, $17d$, the threaded rods $18a$, $18b$, $18c$, $18d$, the latter two of which are not visible in the drawing, and the nuts $19a$, $19b$, $19c$, $19d$. The chains are conveniently protected by covers 20 and 25. Hand wheel 13 displaces the lower frame B through chain gearings, worms, worm wheels $22a$, $22b$, $22c$, $22d$, screws $23a$, $23b$, $23c$, $23d$, the latter two not being visible, and nuts $24a$, $24b$, $24c$, $24d$.

Cover 25 protects the chains operated by wheel 13 and affords easy inspection.

Worms $16a$, $16b$, $16c$, $16d$ are connected by means of shafts 26 and 27 and couplings 28 and 28'. In this way uniform lifting is obtained at the four corners of the frame. The cross-beams 29 and 30, Fig. 3, rigidly connect the upper slides 31 carrying the upper rollers 33 and the lower slides 32 carrying the lower rollers 34 respectively. Equilibrium of the weight of the frames, upper and lower, is obtained in the following manner:

The weight of the upper frame rests on the vertical screws $18a$, $18b$, $18c$, $18d$; that of the lower frame rests on the threaded rods $23a$, $23b$, $23c$, $23d$. Each threaded rod is supported by a bearing, $P_2$ and $P_3$ being shown in Fig. 1 for the rods $18a$ and $18b$, respectively, and bearings $P_1$ and $P_4$ for rods $23a$ and $23b$, respectively.

The bearings rest individually on the short arm of the levers $L_1$, $L_2$, $L_3$, $L_4$, respectively. The long arm of each lever carries an adjustable weight $M_1$, $M_2$, $M_3$, $M_4$, respectively, of such magnitude as to constantly and resiliently produce an equal pressure of the upper and lower rollers against the intermediate rollers. The upper rollers 33 and the lower rollers 34 are revolvably supported in bearings 35 and 36, respectively, which are resiliently carried in the reciprocating slides 31 and 32, resiliently being afforded by springs 38, Fig. 3.

Figure 5:
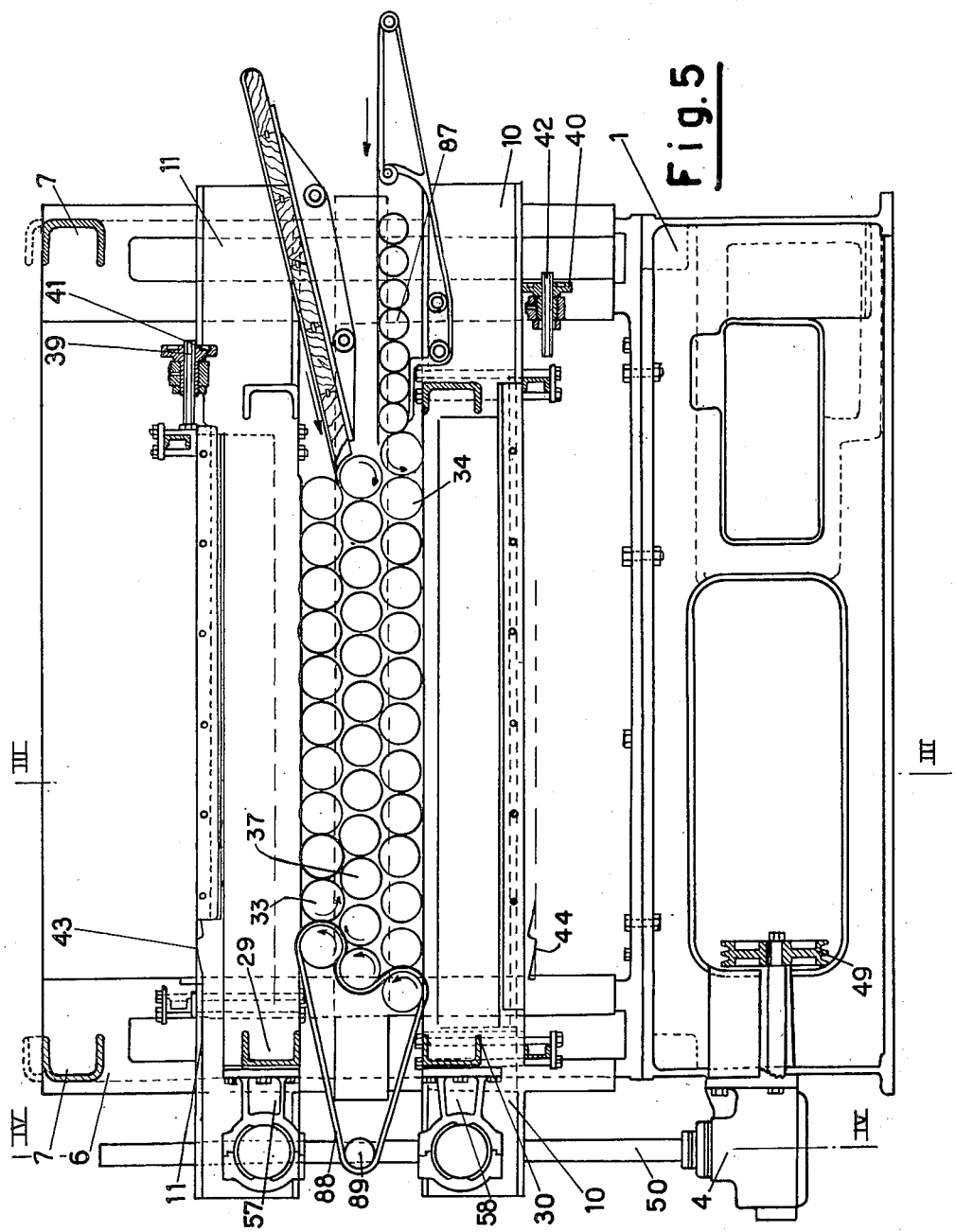
Fig. 5 is a longitudinal part sectional view of the machine according to the invention.

The adjustment of the springs is effected by means of a device that simultaneously regulates all springs of a row of bearings. If the hand wheels 41 or 40, Fig. 5, are rotated, slides having inclined surfaces 43 and 44, respectively, are reciprocated because they are connected with screws 39 and 42, respectively, which extend into threaded bores of wheels 41 and 40. The slides act on the springs 38 placed inside each bearing support and pressing a push rod 45 out of the supports. This adjustment serves to make the impact more or less elastic, which is caused by the upper and lower rollers against the intermediate rollers 37 during their oscillatory movement. The oscillatory movement of the upper and lower frames is obtained by transmitting a rotary movement from the drive shaft, by means of a sheave 47 and a V-belt to a sheave 48, Fig. 6, said rotary movement being further transmitted by means of a belt, sheaves 49 and 49a, bevel gears and, in the box 4, to the vertical shaft 50. Shaft 50 extends to suitable boxes fixed to the frame-carrying slides and slidable therewith. The boxes contain bevel gears 51 and 52, Fig. 4, which transmit their movement to bevel gears 53 and 54, respectively, fitted onto the shafts 55 and 56. The shafts 55 and 56 have eccentric portions $X$, $Y$ and $X_1$, $Y_1$ respectively.

Brackets 57 and 58 rotatably carried by said eccentric portions impart to the frame-carrying slides 29 to 32 a transverse oscillation equal to the double of the eccentricity. Fly-wheels 59 and 60 are fitted on the ends of shafts 55, 56, respectively, distal of the ends fitted with bevel gears to make the intensity of oscillation more uniform. The intermediate rollers 37 are axially movably borne in bearings 62 and 63. The rollers 37 are not only rotated but also rapidly axially reciprocated by a shaft provided with eccentrics 46, Fig. 3. Each individual eccentric controls a fork 64 to which a pin 65 is connected having a spherical end movable in a bearing 66 and connected to the shaft 67 of the intermediate rollers 37 for axially reciprocating the rotating rollers.

Figure 6:
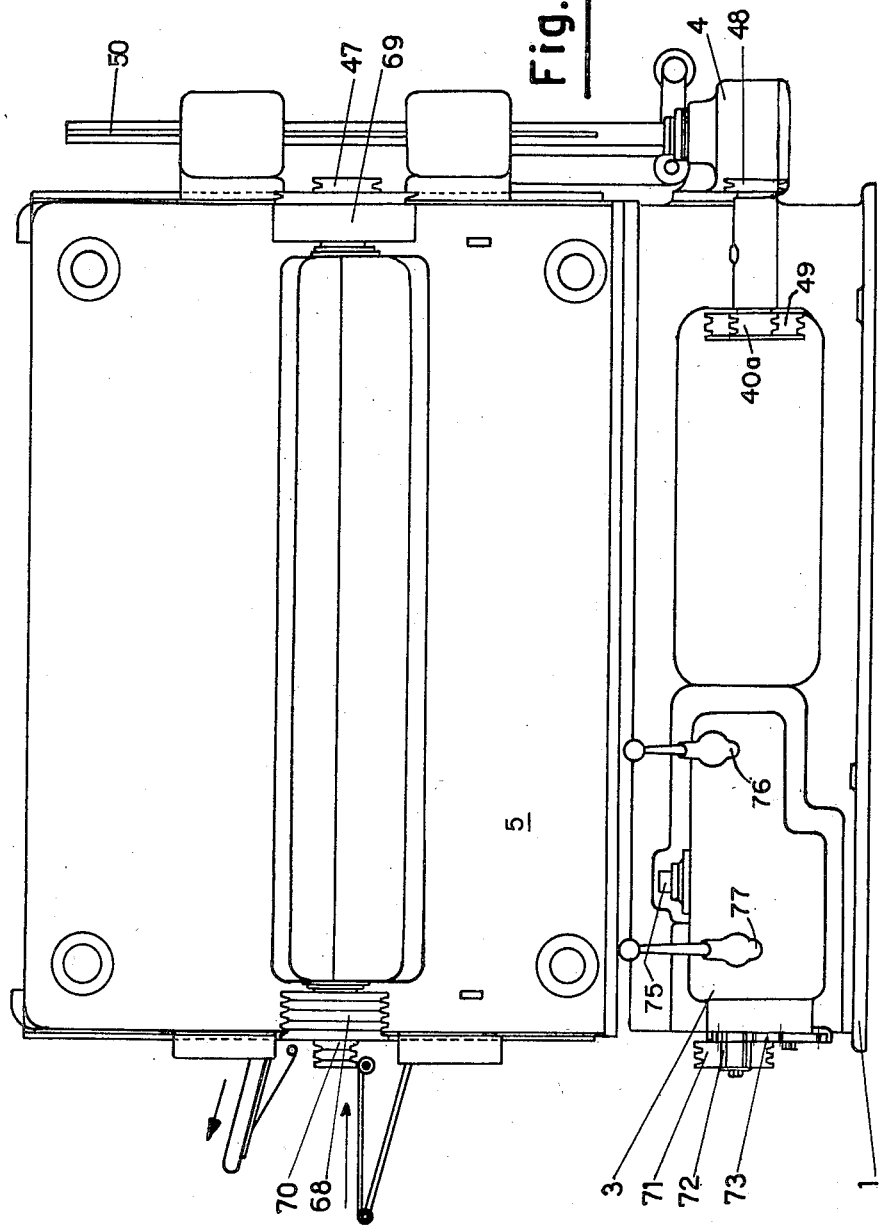
Fig. 6 is a view of the side of the machine opposite to that shown in Fig. 5.

As seen in Fig. 6, sheave 68 fixed to shaft 46 is driven by the electric motor for driving the machine by means of V-belts.

At the side opposed to the drive side, a flywheel 69 is rigidly connected to shaft 46 to make the axial oscillations of the intermediate rollers more uniform. Also on the drive side is a sheave 70 driving by means of a V-belt a pulley 71 which drives the speed reducing gears 72 and 73 outside of and change speed gears in box 3 for rotating the rollers through vertical shafts 74 and 75, Fig. 2. The shaft 74 can turn relative to the shaft 75 at the same speed, or at a speed higher by a fixed percentage. For adjustment of the relative speeds of shafts 74 and 75, lever 76 on the outside of box 3 must be manipulated. By changing the relative speeds of the intermediate and upper rollers and of the intermediate and lower rollers, displacement of the felt portions contacting one and the other set of rollers is obtained and, consequently, automatic crossing of the felt. Not only the relative speeds of the shafts 74 and 75 can be adjusted but also their interdependent speeds. To effect such change lever 77 must be manipulated. Rotation of the rollers by the vertical shafts 74 and 75 is effected by bevel gears 78, 79, 80 and the threaded rods 81, 82, 83, Fig. 3, and by the worm wheels 84, 85, and 86 fitted onto each individual roller. The mechanism affords different rates of peripheral speed of all sets of rollers and, therefore, of felt conveyance, which rates also effect the felting speed. The more quickly the felt advances between the rollers, the lower is the number of impacts per centimetre of length imparted to the felts and the lower is the felting frequency; the slower the felts advance, the higher is the number of impacts effected per centimetre of length and the higher is the frequency of fulling. The total number of rollers in the machine may vary according to the kind of fulling required. The felts are fed into the machine by a flat feeder constituted by a roller assembly 87, whose rollers receive the felts placed by the operator and forward them to enter between the intermediate and lower rollers.

At the delivery side of the penultimate lower roller the felt is gripped between a roller and a rubber band 88, Fig. 5, running over said roller; the felt emerging from between the intermediate and lower rollers is made to enter between the rows of intermediate and upper rollers. The band 88 is tensioned by a roll 89 carried by levers 90, Fig. 7. The band is resilient and its tension is adjusted by a counterweight or by a spring connected to the levers 90. If desired, the feeding may be effected in an adverse manner, namely: the felts are placed between the intermediate and upper rollers and, with the aid of the band, are conveyed to enter between the intermediate and lower rollers. With this arrangement, the first fulling is performed by the upper rollers and the second fulling by the lower rollers and, feeding and discharging are effected on the same side of the machine feeding on a higher plane and discharging on a lower plane.

Figure 1:
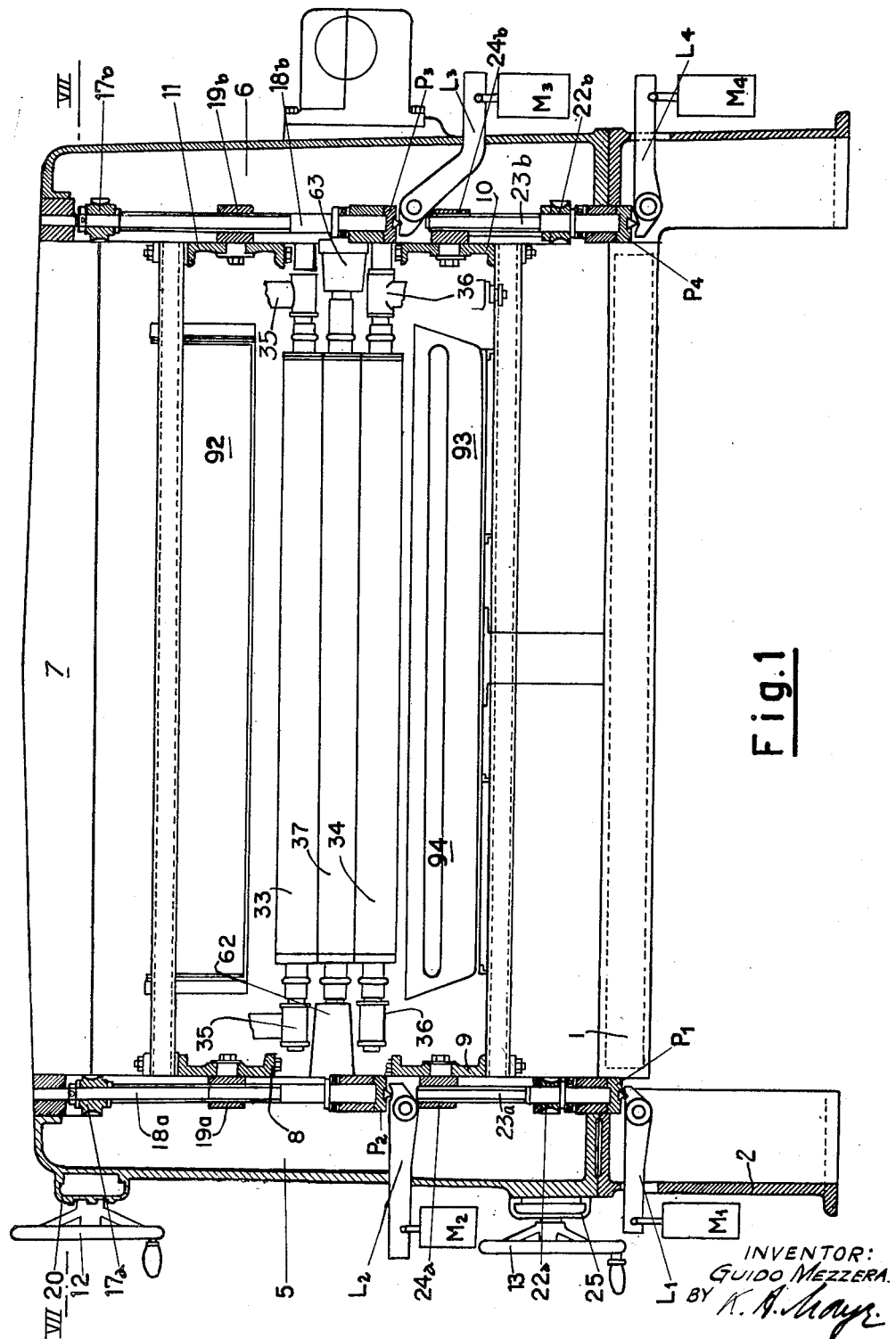
Fig. 1 represents a vertical cross-section of a machine according to the invention, the section being made along line I—I in Fig. 5.
Figure 2:
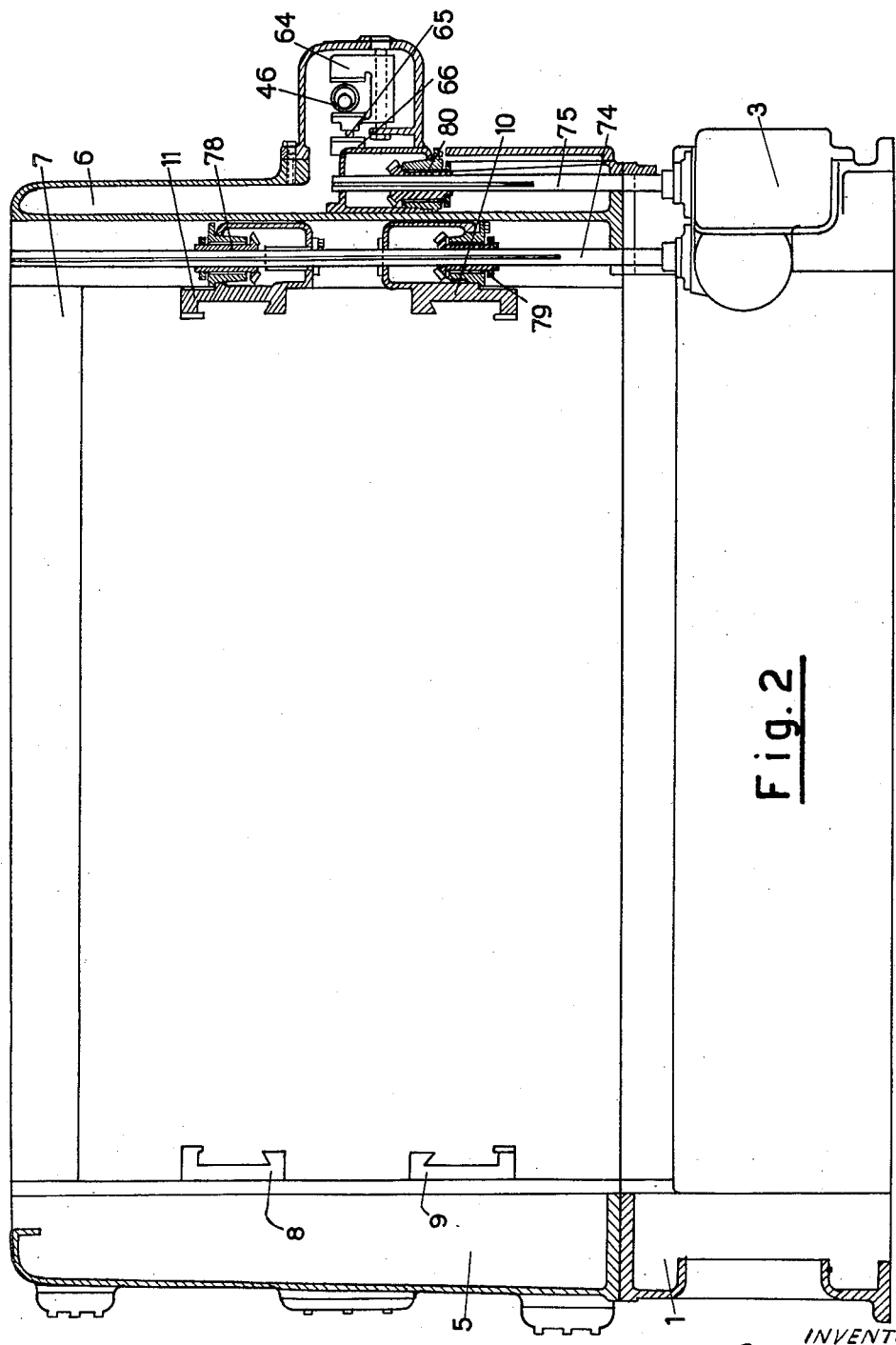
Fig. 2 shows a vertical cross-section of a part of the machine shown in Fig. 1, the section being made along line II—II in Fig. 5.

A pan 92, Fig. 1, is fixed to the upper frame and suitably perforated for wetting the felts during their fulling travel. The lower frame carries a pan 93 containing pipe 94. The upper surface of the pipe is perforated for discharging a liquid to wet the felts during their travel between the rollers, the pan 93 collecting the liquid dripping from the felt.

Fig. 8 illustrates a modified mechanism for vibrating the frames supporting the felting rollers. Bearings 95 are arranged on the base of the machine for supporting the intermediate fulling rollers 96. A transverse shaft 99 is rotatably supported at the end of beam 97 extending from column 98 and provided with an eccentric 100 rotating in a collar 101 provided with a rod 102 whose free end is articulated to the frame 103. The latter is thus suspended from the stationary frame of the machine in such a manner that it can oscillate in the longitudinal vertical plane of the felting machine.

The frame 103 is provided with vertical guides 104 in which are slidable the supports for the bearings of the fulling rollers. The supports are subjected to the action of a coil spring 105, whose initial compression is adjustable by means of a screw 106. Collars 107 provided on the slidable supports limit the stroke of the supports.

To the frame 103 is articulated a connecting rod 108, which is pivoted to a rocker 109, one end of which is formed as a fork 110. An eccentric 111 rigidly fitted onto a shaft 112 revolving in supports 113 engages the inside of the fork for swinging it laterally.

The supports 113 are slidable in guides 114 and may be fixed in a suitable position, the guides being rigidly connected with the stationary frame of the machine.

If the position of the supports in the guide 114 is changed, the length of the arm of the rocker 109 actuated by the eccentric is also changed and, therefore, also the stroke of the connecting rod 108.

Fig. 9 illustrates a coupling for connecting a fulling roller to its drive shaft. The end of the roller is provided with a coaxial frusto-conical extension 115, joined at its smaller base to the roller. The drive shaft is provided, at the end facing the roller, with a similar extension 116 which faces with its large diameter end the conical extension of the roller. Both extensions are joined by means of a sleeve 117 which is split into two halves and whose interior is so shaped as to embrace the terminal extension of the roller as well as that of the shaft, the two halves of the sleeve being connnected by bolts. A diametrically located pin within the sleeve prevents relative rotation of the roller and its shaft.

Having now particularly described and ascertained the nature of my said invention, and in what manner the same is to be performed, I declare that what I claim is:

1. A roller felting machine comprising a stationary frame, a set of rollers rotatably supported by said frame, a second frame, a second set of rollers rotatably supported by said second frame, said stationary frame having a portion at an elevation higher than that of said second frame, suspension means swingably depending from said portion and having a lower end pivoted to said second frame for affording substantially horizontal reciprocating motion of the latter, and a reciprocating mechanism connected with said second frame for imparting substantially horizontal reciprocating motion thereto transversely to the longitudinal axes of the rollers of the second set.

2. A roller felting machine as defined in claim 1, said reciprocating means comprising stroke adjusting means for changing the extent of the reciprocating motion.

GUIDO MEZZERA.

REFERENCES CITED

The following references are of record in the file of this patent:

UNITED STATES PATENTS

| Number | Name | Date |
|---|---|---|
| 1,984,701 | Reynolds | Dec. 18, 1934 |
| 2,169,372 | Pecker | Aug. 15, 1939 |
| 2,325,909 | Genest | Aug. 3, 1943 |
| 2,506,855 | Casse | May 9, 1950 |
| 2,579,814 | Genest | Dec. 25, 1951 |

FOREIGN PATENTS

| Number | Country | Date |
|---|---|---|
| 295,775 | Great Britain | Aug. 23, 1928 |